US012406208B2

(12) United States Patent
Ikeda et al.

(10) Patent No.: US 12,406,208 B2
(45) Date of Patent: Sep. 2, 2025

(54) ANOMALY DETECTION METHOD USING AN AUTOENCODER LEARNING FROM DATA ITEMS COLLECTED BY MEASURING DEVICES

(71) Applicant: NIPPON TELEGRAPH AND TELEPHONE CORPORATION, Chiyoda-ku (JP)

(72) Inventors: Yasuhiro Ikeda, Musashino (JP); Yusuke Nakano, Musashino (JP); Keishiro Watanabe, Musashino (JP); Keisuke Ishibashi, Musashino (JP); Ryoichi Kawahara, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 435 days.

(21) Appl. No.: 16/481,672

(22) PCT Filed: Nov. 7, 2017

(86) PCT No.: PCT/JP2017/040104
§ 371 (c)(1),
(2) Date: Jul. 29, 2019

(87) PCT Pub. No.: WO2018/142704
PCT Pub. Date: Aug. 9, 2018

(65) Prior Publication Data
US 2019/0392350 A1    Dec. 26, 2019

(30) Foreign Application Priority Data
Feb. 2, 2017 (JP) ................. 2017-017920

(51) Int. Cl.
*G06N 20/10* (2019.01)

(52) U.S. Cl.
CPC ................. *G06N 20/10* (2019.01)

(58) Field of Classification Search
CPC .......... G06N 20/10; G06N 5/04; G06N 20/00; H04L 63/1425; G06F 16/00; G06F 11/07
See application file for complete search history.

(56) References Cited

U.S. PATENT DOCUMENTS

| 8,682,824 B2 * | 3/2014 | Shibuya | ............... G05B 23/021 706/45 |
| 2013/0024415 A1 | 1/2013 | Herzog | |

(Continued)

FOREIGN PATENT DOCUMENTS

| JP | 2007-329329 A | 12/2007 |
| JP | 2014-525096 A | 9/2014 |

OTHER PUBLICATIONS

Sakurada, Mayu, and Takehisa Yairi. "Anomaly detection using autoencoders with nonlinear dimensionality reduction." Proceedings of the MLSDA 2014 2nd workshop on machine learning for sensory data analysis. 2014. https://dl.acm.org/doi/pdf/10.1145/2689746.2689747 (Year: 2014).*

(Continued)

*Primary Examiner* — Kakali Chaki
*Assistant Examiner* — Michael H Hoang
(74) *Attorney, Agent, or Firm* — Oblon, McClelland, Maier & Neustadt, L.L.P.

(57) ABSTRACT

A feature value generation device includes a generator configured to generate vectors whose elements are feature values of data items collected at a plurality of timings from a target of anomaly detection, so as to normalize or standardize the vectors based on a set of predetermined vectors; a learning unit configured to learn the predetermined vectors so as to output a learning result; and a detector configured to detect, for each of the vectors normalized or standardized by the generator, an anomaly based on said each of the vectors (Continued)

and the learning result. The set of predetermined vectors is a set of vectors with which no anomaly is detected by the detector, and the set of vectors is updated in accordance with no anomaly being detected by the detector.

5 Claims, 6 Drawing Sheets

(56) References Cited

U.S. PATENT DOCUMENTS

2017/0026250 A1* 1/2017 Hu .................. H04L 41/147
2019/0297520 A1* 9/2019 Vedam ............. H04L 43/0876

OTHER PUBLICATIONS

Limthong, Kriangkrai. "Real-time computer network anomaly detection using machine learning techniques." Journal of Advances in Computer Networks 1.1 (2013): 126-133. (Year: 2013). https://www.researchgate.net/profile/Kriangkrai-Limthong/publication/272909431_Real-Time_Computer_Network_Anomaly_Detection_Using_Machine_Learning_Techniques/links/54f92adf0cf210398e979030/Real-Time-Computer-Network-Anomaly-Detection-Using-Machine-Learning-Techniques.pdf.*

Zolotukhin, Mikhail, et al. "Analysis of HTTP requests for anomaly detection of web attacks." 2014 IEEE 12th International Conference on Dependable, Autonomic and Secure Computing. IEEE, 2014. https://ieeexplore.ieee.org/stamp/stamp.jsp?tp=&arnumber=6945724 (Year: 2014).*

Duong, Nguyen Ha, and Hoang Dang Hai. "A semi-supervised model for network traffic anomaly detection." 2015 17th International Conference on Advanced Communication Technology (ICACT). IEEE, 2015. https://ieeexplore.ieee.org/stamp/stamp.jsp?tp=&arnumber=7224759 (Year: 2015).*

Breitbart, Yuri, et al. "Efficiently monitoring bandwidth and latency in IP networks." Proceedings IEEE Infocom 2001. Conference on Computer Communications. Twentieth Annual Joint Conference of the IEEE Computer and Communications Society (Cat. No. 01CH37213). vol. 2. IEEE, 2001. (Year: 2001). https://ieeexplore.ieee.org/stamp/stamp.jsp?tp=&arnumber=916285.*

D. Liu, C. - H. Lung, N. Seddigh and B. Nandy, "Network Traffic Anomaly Detection Using Adaptive Density-Based Fuzzy Clustering, " 2014 IEEE 13th International Conference on Trust, Security and Privacy in Computing and Communications, 2014, pp. 823-830, doi: 10.1109/TrustCom.2014.109. (Year: 2014).*

[Item U continued] https://ieeexplore.IEEE.org/document/7011333 (Year: 2014).*

Salem, Maher, and Ulrich Buehler. "Mining techniques in network security to enhance intrusion detection systems." arXiv preprint arXiv:1212.2414 (2012). https://arxiv.org/ftp/arxiv/papers/1212/1212.2414.pdf (Year: 2012).*

Wazid, Mohammad, and Ashok Kumar Das. "An efficient hybrid anomaly detection scheme using K-means clustering for wireless sensor networks." Wireless Personal Communications 90 (2016): 1971-2000. https://link.springer.com/article/10.1007/s11277-016-3433-3 (Year: 2016).*

International Search Report issued on Dec. 19, 2017 in PCT/JP2017/040104 filed in Nov. 7, 2017.

Sakurada, M. et al., "Dimensionality Reduction with the Autoencoder for Anomaly Detection of Spacecrafts", The 28$^{th}$ Annual Conference of the Japanese Society for Artificial Intelligence, 2014, pp. 1-3.

Banerjee, A. et al., "A Support Vector Method for Anomaly Detection in Hyperspectral Imagery", IEEE Transactions on Geoscience and Remote Sensing, vol. 44, No. 8, Aug. 2006, pp. 2282-2291.

Muteki, K., "Process Monitoring Development Utilizing Plant Data-Multivariate Analysis Applications (Consideration on operating support utilizing plant data)—(Concept of user-oriented operating support and utilization of on-site data)", Instrumentation and Control Engineering, vol. 45, No. 1, 2002, 13 pages (with unedited computer-generated English translation).

* cited by examiner

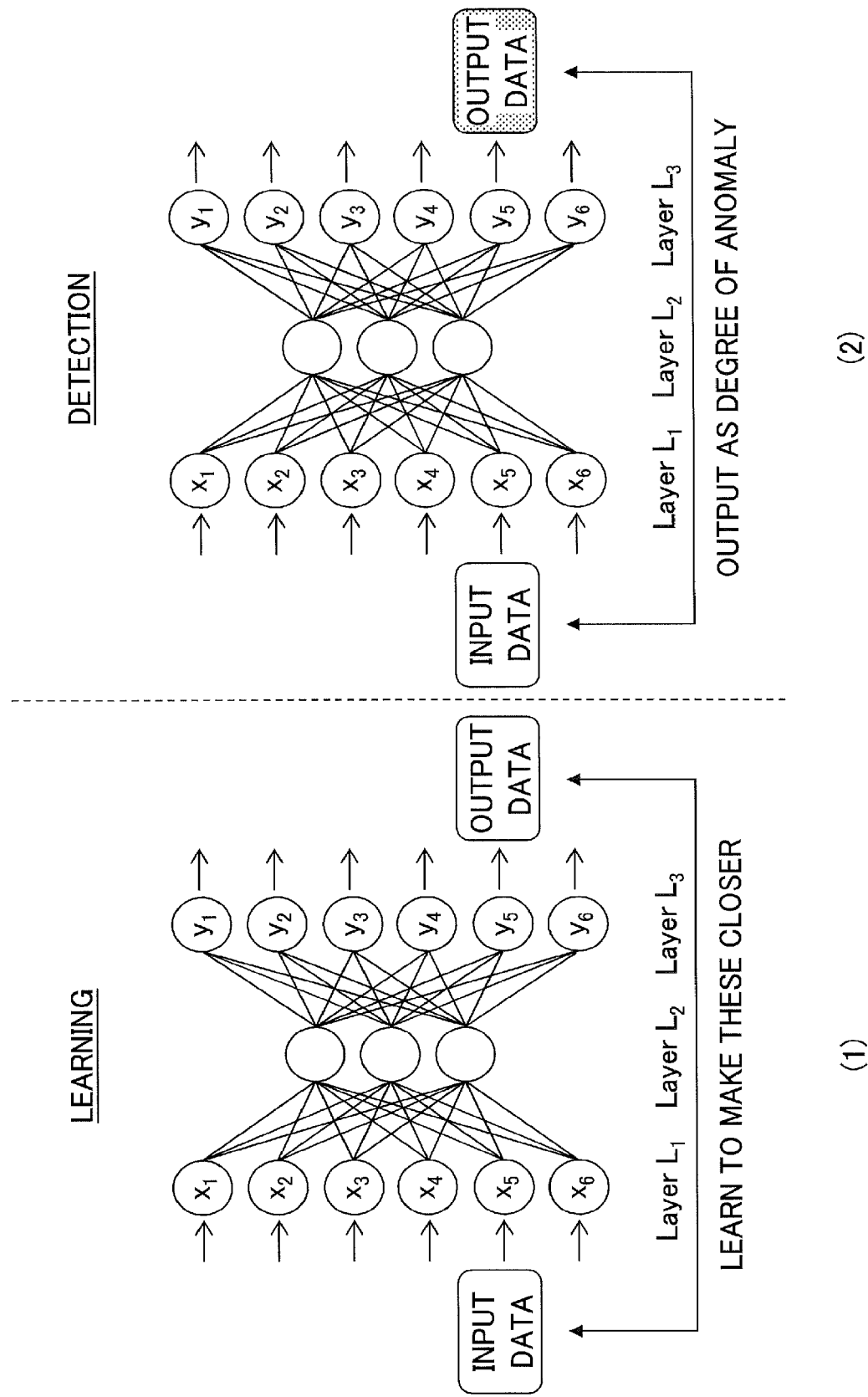

ANOMALY DETECTION METHOD USING AN AUTOENCODER LEARNING FROM DATA ITEMS COLLECTED BY MEASURING DEVICES

TECHNICAL FIELD

The present invention relates to a feature value generation device, a feature value generation method, and a program.

BACKGROUND ART

As a real-time method of anomaly detection of a computer system, one may consider an algorithm that periodically observes various data items on the system so as to detect the data as "anomalous" if the data exhibits a tendency different from normal ones.

For example, an anomaly detection algorithm may be considered in which data in a "learning period" defined in advance as a normal time is used as training data to be learned, and during a "test period" to execute anomaly detection, a tendency in observed test data is compared with a tendency in the learned training data.

Although various techniques have been proposed as anomaly detection algorithms, in many cases, it is desirable that data to be input be represented in normalized vectors (see, e.g., Non-patent document 1 and Non-patent document 2).

RELATED ART DOCUMENTS

Non-Patent Documents

Non-Patent Document 1: Mayu Sakurada, Takehisa Yairi, "Dimensionality Reduction with the Autoencoder for Anomaly Detection of Spacecrafts", 28th Annual Conference of the Japanese Society for Artificial Intelligence, 1-3, 2014

Non-Patent Document 2: Amit Banerjee, Philippe Burlina, and Chris Diehl, "A Support Vector Method for Anomaly Detection in Hyperspectral Imagery", IEEE Transactions on Geoscience and Remote Sensing vol. 44, no. 8, p. 2282, 2006

SUMMARY OF INVENTION

Problem to be Solved by the Invention

In the case of detecting anomaly based on observed data in a network, as observed data, data (feature values) such as traffic volume per host or flow may be considered. Such data has various attributes and values, and ideas are required to represent them as a simple vector. Also, as in the case of traffic volume, when taking data that has a long-term increasing/decreasing trend (change in the value) as input, there are problems such that the distribution of observed data may considerably differ between a learning period and a test period, and thereby, it is difficult to normalize the observed data.

The present invention has been made in view of the above, and has an object to generate a feature value that takes into account a long-term change in data collected from a target of anomaly detection.

Means for Solving the Problem

Thereupon, in order to solve the above problems, a feature value generation device includes a generator configured to generate vectors whose elements are feature values of data items collected at a plurality of timings from a target of anomaly detection, so as to normalize or standardize the vectors based on a set of predetermined vectors; a learning unit configured to learn the predetermined vectors so as to output a learning result; and a detector configured to detect, for each of the vectors normalized or standardized by the generator, an anomaly based on said each of the vectors and the learning result. The set of predetermined vectors is a set of vectors with which no anomaly is detected by the detector, and the set of vectors is updated in accordance with no anomaly being detected by the detector.

Advantage of the Invention

It is possible to generate a feature value that takes into account a long-term change in data collected from a target of anomaly detection.

BRIEF DESCRIPTION OF DRAWINGS

FIG. 6 is a diagram illustrating an autoencoder.

EMBODIMENTS OF THE INVENTION

Figure 1:
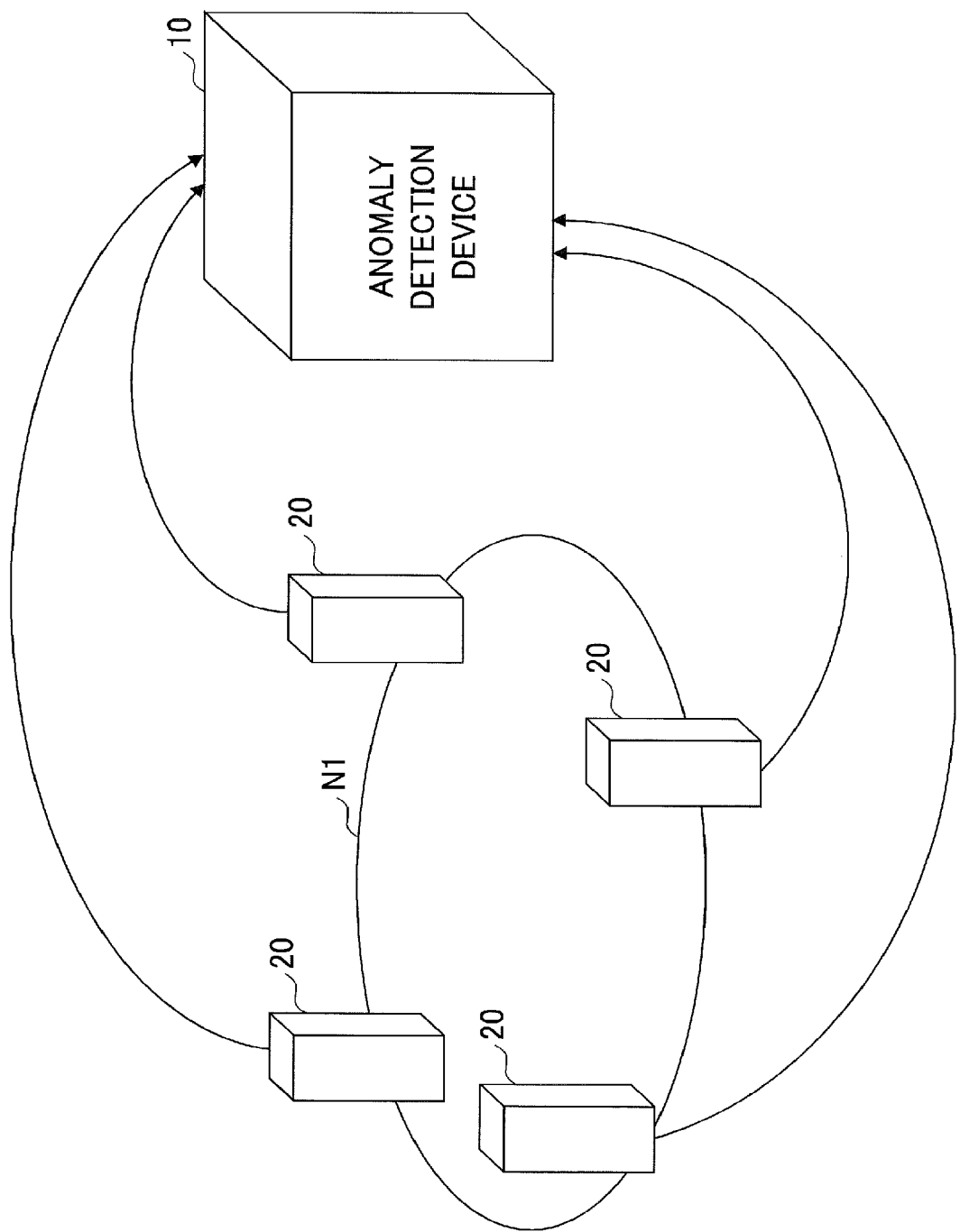
FIG. 1 is a diagram illustrating an example of a system configuration according to a first embodiment.

In the following, embodiments of the present invention will be described with reference to the drawings. FIG. 1 is a diagram illustrating an example of a system configuration according to a first embodiment. In FIG. 1, a network N1 is a network in which anomaly is to be detected. The network N1 is constituted with multiple nodes, such as routers and server devices being connected with each other, in which packets are transmitted and received between any nodes to provide predetermined services.

Measuring devices 20 are arranged at multiple locations in the network N1. The measuring device 20 samples observed data obtained by monitoring the arranged location at multiple timings. Examples of observed data to be collected include MIB (Management Information Base) data, flow data by NetFlow, and CPU utilization.

MIB is a common policy among manufacturers for monitoring network devices. MIB data is aggregated, for example, in units of five minutes, which may include "time, host name, interface (IF) name, input data amount (ibps), output data amount (obps)", and the like.

NetFlow is a technology to monitor a network by units of flows so as to output information on each flow when communication is completed. Also, the flow is a unit for identifying "what communication" is executed between "where" and "where" with "how much volume", which may be profiled with five attributes of communication including the IP address of the sender (srcIP); the port number of the sender (srcport); the IP address of the recipient (dstIP); the port number of the recipient (dstport); and the communication protocol (proto). Flow data includes "flow start time, srcIP, srcport, dstIP, dstport, proto, flow duration, total number of transmitted packets, total number of transmitted bytes", and the like.

The CPU utilization is, for example, the use rate of a CPU of a server device or router included in the network N1.

Observed data sampled by the measuring device 20 is collected by the anomaly detection device 10. The anomaly detection device 10 is a computer that learns features in a normal time from the collected observed data, and based on the learning result, detects an occurrence of an anomaly (determines the presence or absence of an anomaly) with respect to observed data input after the learning. The process of learning features in a normal time is referred to as the "learning process". The process of detecting anomaly based on a learning result obtained in the learning process is referred to as the "test process".

Figure 2:
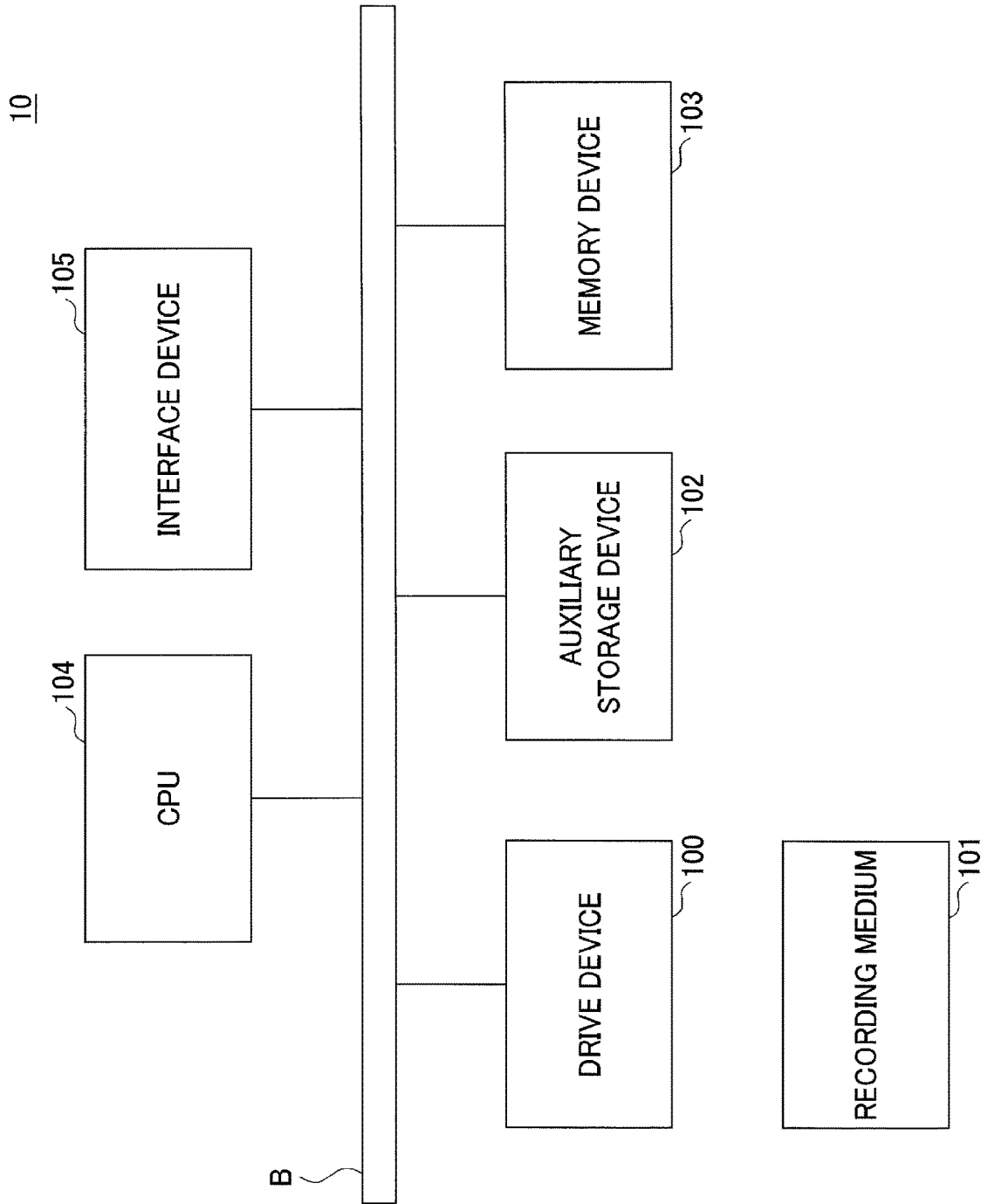
FIG. 2 is a diagram illustrating an example of a hardware configuration of an anomaly detection device 10 according to the first embodiment.

FIG. 2 is a diagram illustrating an example of a hardware configuration of the anomaly detection device 10 according to the first embodiment. The anomaly detection device 10 in FIG. 2 includes a drive device 100, an auxiliary storage device 102, a memory device 103, a CPU 104, and an interface device 105, which are connected with each other via a bus B.

A program that implements processing on the anomaly detection device 10 is provided by a recording medium 101 such as a CD-ROM. When the recording medium 101 storing the program is set into the drive device 100, the program is installed in the auxiliary storage device 102 from the recording medium 101 through the drive device 100. However, installation of the program does not necessarily need to be done from the recording medium 101; the program may be downloaded from another computer via a network. The auxiliary storage device 102 stores the installed program and stores necessary files, data, and the like.

The memory device 103 reads out the program from the auxiliary storage device 102 and stores the program when an activation command of the program is received. The CPU 104 executes functions relating to the anomaly detection device 10 according to the program stored in the memory device 103. The interface device 105 is used as an interface for connecting to a network.

Figure 3:
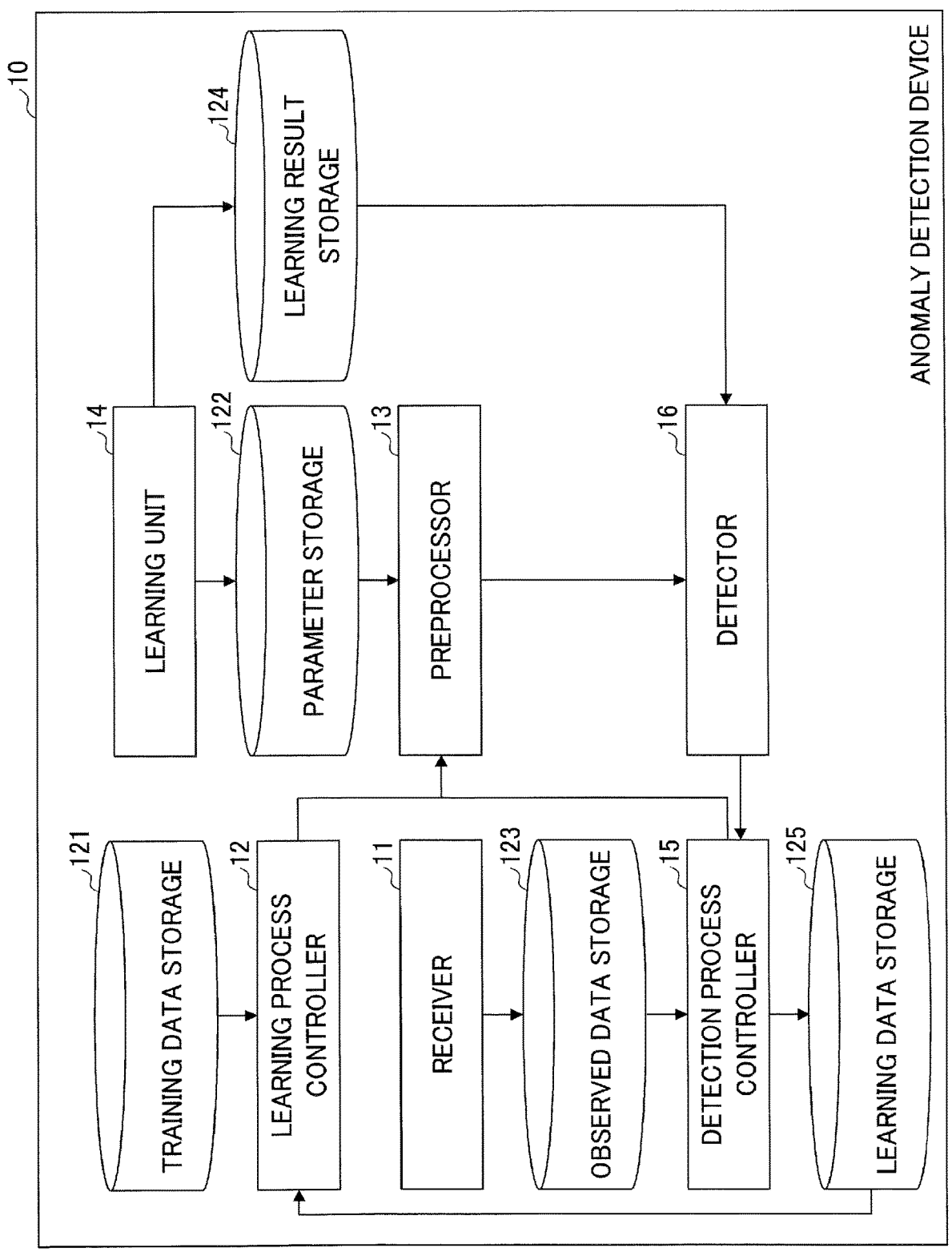
FIG. 3 is a diagram illustrating an example of a functional configuration of the anomaly detection device 10 according to the first embodiment.

FIG. 3 is a diagram illustrating an example of a functional configuration of the anomaly detection device 10 according to the first embodiment. In FIG. 3, the anomaly detection device 10 includes a receiver 11, a learning process controller 12, a preprocessor 13, a learning unit 14, a detection process controller 15, and a detector 16. Each of these units is implemented by a process that one or more programs installed in the anomaly detection device 10 cause the CPU 104 to execute. The anomaly detection device 10 also uses a training data storage 121, a parameter storage 122, an observed data storage 123, a learning result storage 124, and a learning data storage 125. Each of these storage units can be implemented, for example, by using the auxiliary storage device 102 or a storage device that can be connected to the anomaly detection device 10 via a network.

In the training data storage 121, observed data that has been confirmed to have been collected in a normal time is stored as training data. However, training data may be artificially generated instead of selected from among observed data.

The receiver 11 receives observed data from the measuring devices 20. The received observed data is stored in the observed data storage 123.

The learning process controller 12 controls a learning process.

The preprocessor 13 executes a preprocess for a set of training data, a set of observed data, or a set of learning data stored in the learning data storage 125. The preprocess is a process of extracting feature values for unit-time intervals from a data set, a process of normalizing the extracted feature values, and the like. Feature values are expressed in the form of vectors. Note that in a first learning period, a group of training data stored in the training data storage 121 is preprocessed. Once the receiver 11 has started receiving observed data, the group of observed data is preprocessed. Further, once the detector 16 has started detecting anomaly, and the observed data that is determined to be normal and stored in the learning data storage 125 as the learning data reaches a predetermined number of data items, the group of learning data is preprocessed.

When preprocessing a group of training data or a group of learning data, the preprocessor 13 also generates or updates parameters for normalizing the observed data or the learning data (referred to as the "normalization parameters", below), and stores the generated or updated normalization parameters in the parameter storage 122.

The learning unit 14 executes learning based on training data or learning data. The learning result obtained by the learning unit 14 is stored in the learning result storage 124.

The detection process controller 15 controls a detection process.

The detector 16 detects an occurrence of an anomaly based on a vector generated when the preprocessor 13 applies a preprocess to the observed data stored in the observed data storage 123, and on a learning result stored in the learning result storage 124. Specifically, the detector 16 calculates for the preprocessed vector a difference from the learning result as the degree of anomaly, and compares the degree of anomaly to a threshold value to detect an occurrence of an anomaly. A value before normalization of the vector with which no anomaly is detected is stored in the learning data storage 125 as learning data.

Figure 4:
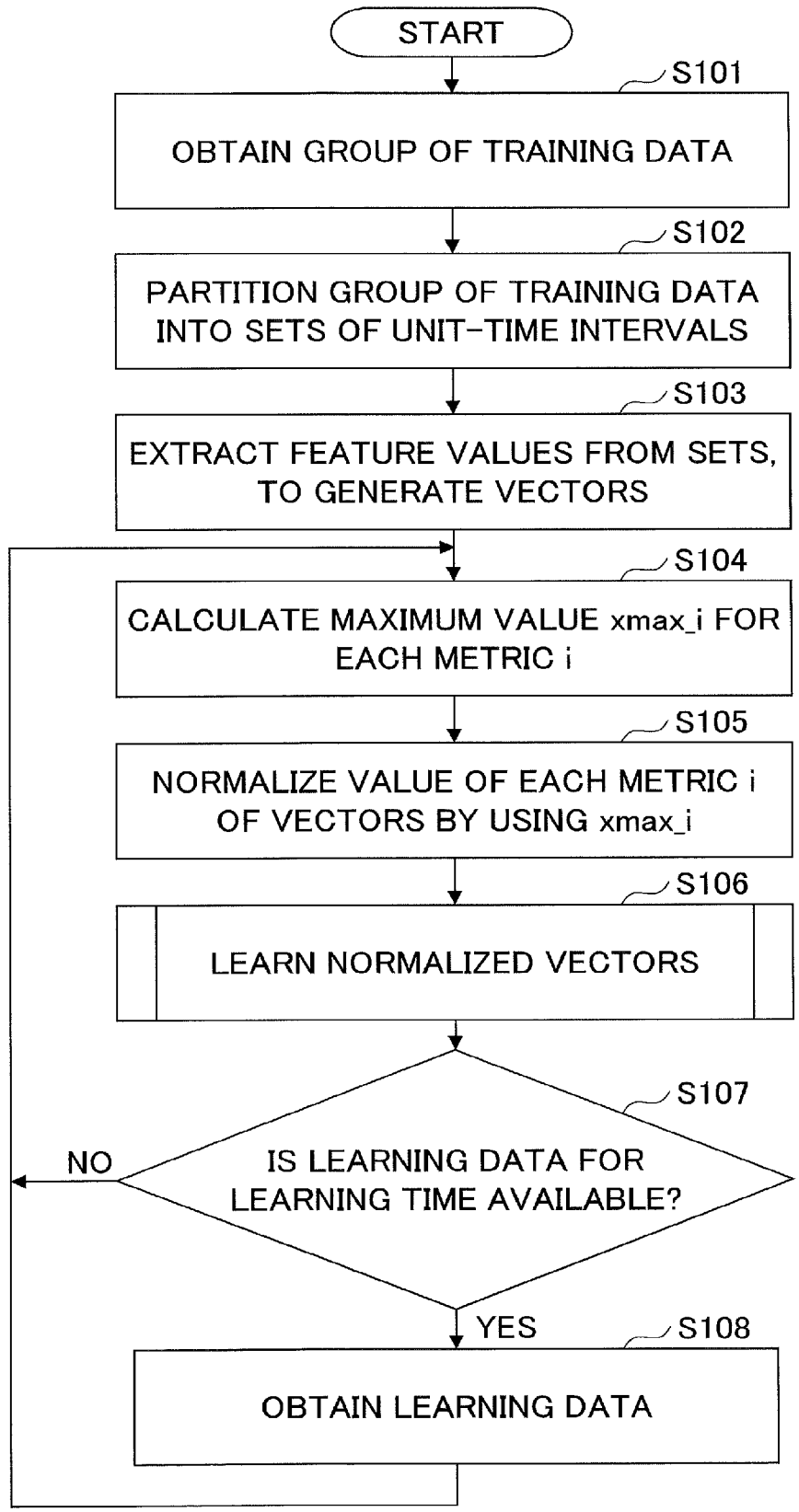
FIG. 4 is a flowchart for describing an example of processing steps of a learning process according to the first embodiment.

In the following, processing steps executed by the anomaly detection device 10 will be described. FIG. 4 is a flowchart for describing an example of processing steps of a learning process according to the first embodiment. Note that in the following, for the sake of convenience, an example will be described in which the flow data is the processing target.

Once the learning process has been started, the learning process controller 12 obtains a group of training data from the training data storage 121 and inputs the group of training data into the preprocessor 13 (S101).

Next, the preprocessor 13 partitions the input group of training data into sets corresponding to unit-time intervals (S102). Here, assume that the training data storage 121 stores training data corresponding to a period of the unit time multiplied by U intervals (referred to as the "learning period", below). Therefore, the group of training data is partitioned into U sets.

Next, the preprocessor 13 extracts feature values in accordance with the purpose for each of the partitioned sets, to generate a multidimensional vector in which the extracted feature values are elements of the respective dimensions (S103).

For example, assume that the unit time is one minute, and the preprocessor 13 extracts a feature value for every one-minute interval. Also, assume that feature values to be extracted are the total numbers of transmitted bytes of respective protocols (TCP and UDP). In this case, assuming that the flow start time of the first training data is 12:00:00, for a set of training data (flow data) whose flow start time t falls within 11:59:00≤t<12:00:00 among all the training data, the preprocessor 13 calculates the total number of transmitted bytes for all flows whose protocol is TCP, the total number of transmitted bytes for all flows whose protocol is UDP, and the like, to generate a two-dimensional vector in which the feature values are the elements of the respective dimensions. Similarly, vectors are generated for the other (U−1) sets, respectively.

Note that as an attribute of a feature value, it is also possible to specify a combination such as "TCP and transmission port number being 80". Also, regarding that each flow has a value such as "the number of flows: 1", the total number of flows having certain attributes may be calculated in the same way to regard it as a feature value.

Next, the preprocessor 13 calculates a maximum value xmax_i of each metric i (each dimension i) among vectors, to store the calculated xmax_i in the parameter storage 122 (S104). In other words, in the first embodiment, the maximum value xmax_i of each metric i is a normalization parameter.

Here, assume that U=3. Also, assume that vectors generated at Step S103 are {{80, 20}, {90, 35}, {100, 50}}. These indicate that the total number of transmitted bytes by TCP and the total number of transmitted bytes by UDP in a period of three minutes were "TCP: 80 bytes, UDP: 20 bytes", "TCP: 90 bytes, UDP: 35 bytes", and "TCP: 100 bytes, UDP: 50 bytes", respectively. In this case, the maximum values xmax_i of the metrics of these vectors are {100, 50} (i.e., xmax_1=100 and xmax_2=50).

Next, the preprocessor 13 normalizes each vector based on the normalization parameters (S105). Normalization is executed by dividing the metric i of each vector by the maximum value xmax_i. Therefore, the normalized vectors are {{0.8, 0.4}, {0.9, 0.7}, {1, 1}}.

Next, the learning unit 14 executes learning on the vectors by using a learning machine (S106). The learning result is stored in the learning result storage 124.

Next, the learning process controller 12 waits for the learning data of the learning period to be stored (accumulated) in the learning data storage 125 (S107). In other words, the waiting continues until U vectors before normalization are stored in the learning data storage 125. Note that in the learning data storage 125, vectors that are determined as normal (with which no anomaly occurs) by the detector 16 are stored.

Once the vectors of the learning period have been stored in the learning data storage 125 (YES at S107), the learning process controller 12 obtains the group of vectors from the learning data storage 125, to input the group of vectors into the preprocessor 13 (S108). Note that the obtained group of vectors is deleted from the learning data storage 125. Next, for the group of vectors, Step S104 and thereafter are executed. Accordingly, at the next Step S105, normalization is executed based on the newly calculated xmax_i.

Figure 5:
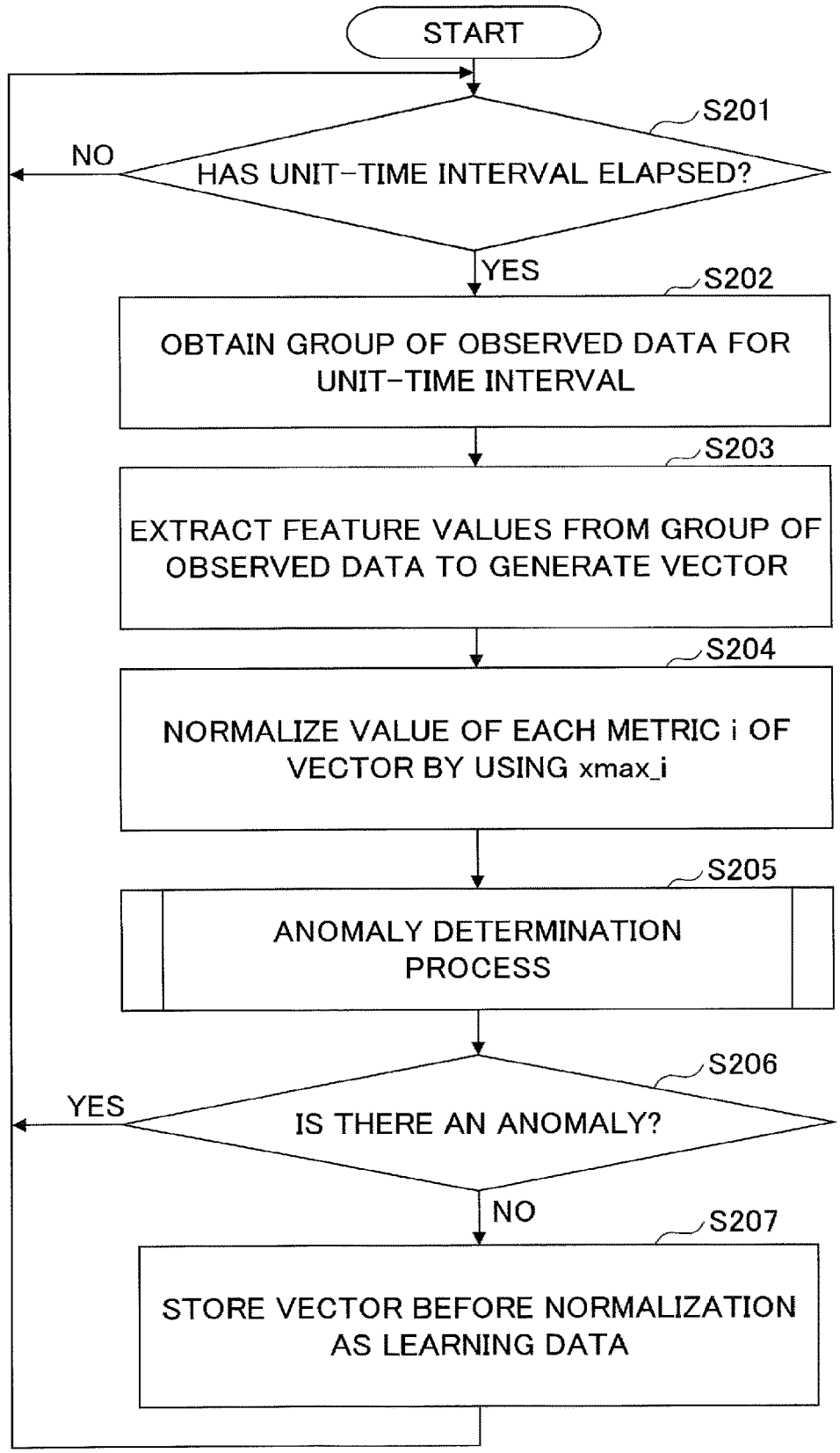
FIG. 5 is a flowchart for describing an example of processing steps of a detection process according to the first embodiment.

FIG. 5 is a flowchart for describing an example of processing steps of a detection process according to the first embodiment. The processing steps in FIG. 5 may be started at any time after Step S106 in FIG. 4 has been executed at least once. In other words, the processing steps in FIG. 5 are executed in parallel with the processing steps in FIG. 4.

At Step S201, the detection process controller 15 waits for a unit-time interval to elapse. The unit-time interval has the same time length as the unit-time interval described with FIG. 4. Observed data collected in real time and received by the receiver 11 during this waiting is stored in the observed data storage 123.

Once the unit-time interval has elapsed (YES at S201), the detection process controller 15 obtains the group of observed data of the latest unit-time interval from the observed data storage 123, to input the group of observed data into the preprocessor 13 (S202).

Next, the preprocessor 13 extracts feature values in accordance with the purpose from the group of observed data, to generate a multidimensional vector in which the extracted feature values are elements of the respective dimensions (S203). For example, the total number of transmitted bytes for all flows whose protocol is TCP and the total number of transmitted bytes for all flows whose protocol is UDP are extracted to generate a two-dimensional vector having these as elements of the respective dimensions. Here, a single vector is generated.

Next, the preprocessor 13 normalizes the generated vector based on the maximum value xmax_i stored in the parameter storage 122 (S204). In other words, each metric i of the vector is divided by the maximum value xmax_i.

For example, if Step S104 in FIG. 4 has been executed only once based on the training data described above, the maximum values xmax_i are {100, 50}. Therefore, if the vector is {60, 40}, the vector is normalized to {0.6, 0.8}.

Next, the detector 16 executes an anomaly determination process (S205). In the anomaly determination process, the presence or absence of an anomaly is determined for the network N1 based on the normalized vector and the latest learning result stored in the learning result storage 124.

If it is determined that there is no anomaly (NO at S206), the detection process controller 15 stores the vector before normalization in the learning data storage 125 as the learning data (S207). If it is determined that there is an anomaly (YES at S206), the vector before normalization is not stored in the learning data storage 125. Accordingly, only vectors determined as normal are stored in the learning data storage 125.

Next, Step S201 and thereafter are repeated. During the course of repeating Step S201 and thereafter, the normalization parameters used at Step S204 are updated as required at Step S104 in FIG. 4 that is being executed in parallel. As a result, the vector can be normalized taking into account the trend of the observed data being input.

For example, in the case of U=3, assume that Step S207 is executed three times and {{60, 40}, {45, 20}, {30, 30}} are stored in the learning data storage 125. In this case, the maximum values are updated as xmax_1=60 and xmax_2=40, and the update result is reflected in the parameter storage 122.

Note that although an example in which the observed data is flow data has been described above, flow data, MIB data, and the CPU utilization may be received in parallel as the observed data. In this case, each step in the processing steps in FIG. 4 and FIG. 5 may be executed for each of the data types (each of the flow data, MIB data, and CPU utilization).

Note that, for example, for MIB data given in a form such as {hostID, interfaceID, ibps, obps}, a vector can be extracted to include "ibps of hostID a in unit-time interval", "obps of hostID a in unit-time interval", "ibps of hostID b in unit-time interval", "obps of host ID b in unit-time interval", . . . , "ibps of interfaceID x in unit-time interval", "obps of interfaceID x in unit-time interval", "ibps of interfaceID y in unit-time interval", and "obps of interfaceID y in unit-time interval".

Next, an example of Step S106 in FIG. 4 and Step S205 in FIG. 5 will be described. At Steps S106 and S205, a group of vectors having a data type attached as the label is input into the learning unit 14 or the detector 16. In the present embodiment, the label is one of "flow data", "MIB data", and "CPU utilization". The label is attached to the training data and observed data, for example, by the measuring device 20 or the receiver 11. In other words, the label to be attached to the observed data can be identified based on the source where the observed data has been sampled. The label is passed on to vectors generated by the preprocessor 13.

At Step S106 in FIG. 4, the learning unit 14 generates a learning machine for each data type. The learning unit 14 classifies vectors based on the labels attached to the input vectors, to input the vectors into one of the learning machines corresponding to the classification result. In the present embodiment, a "learning machine for flow data", a "learning machine for MIB data", and a "learning machine for CPU utilization" are generated. As a learning machine, an autoencoder (Non-Patent Document 1) that detects anomaly by learning a correlation between the metrics of a vector, principal component analysis, or the like may be used. As for principal component analysis, details can be found in, for example, Ringberg, Haakon, et al., "Sensitivity of PCA for traffic anomaly detection", ACM SIGMETRICS Performance Evaluation Review 35.1, pp. 109-120, 2007. In the present embodiment, an example in which an auto encoder is used as a learning machine will be described.

FIG. 6 is a diagram for describing an autoencoder. The autoencoder is an algorithm of anomaly detection based on deep learning. The autoencoder utilizes a fact that normal input data has a correlation between metrics, and hence, can be compressed to lower dimensions. When an anomaly occurs, since the correlation between the input data does not hold, compression is not executed correctly, and the difference between the input data and the output data becomes great.

As illustrated in (1) in FIG. 6, a learning machine (autoencoder) generated by the learning unit 14 executes learning so that the output layer (Layer $L_3$) becomes closer to the input layer (Layer $L_1$). Specifically, the learning unit 14 duplicates a vector into two, applies one of the vectors to the input layer, and applies the other to the output layer, to execute learning so as to output a learning result. The learning result is stored in the learning result storage 124. The learning result is a group of parameters for the learning machine. Note that since the learning machine is generated for each data type, the learning result is also output for each data type to be stored in the learning result storage 124.

Meanwhile, the detector 16, like the learning unit 14, generates a learning machine for each data type. The learning machine may use a method corresponding to the learning machine generated by the learning unit 14, among the autoencoder, principal component analysis, and the like, as in the case of generating a learning machine generated by the learning unit 14.

At Step S205 in FIG. 5, the detector 16 generates a "learning machine for flow data", a "learning machine for MIB data", and a "learning machine for CPU utilization", based on learning results stored in the learning result storage 124. In other words, a learning machine generated by the detector 16 is the same as the learning machine generated by the learning unit 14 when outputting the learning result. As illustrated in (2) in FIG. 6, the detector 16 inputs a vector for each data type input at Step S205 to a learning machine corresponding to the data type of the vector, to calculate the distance between the input data and the output data (an index indicating the degree of collapse of the correlation between the metrics) for the learning machine as the degree of anomaly. In the present embodiment, the mean squared error (MSE) as the distance between the input layer and the output layer of the autoencoder is calculated as the degree of anomaly. The formula of MSE is as follows.

$$MSE = \frac{1}{n}\sum_{i=1}^{n}(\hat{x}_i - x_i)^2$$

In the present embodiment, MSE of flow data, MSE of MIB data, and MSE of CPU utilization are obtained. The detector 16 calculates a mean of the obtained MSE as the final degree of anomaly, to determine that an anomaly occurs if the final degree of anomaly exceeds a predetermined threshold value. Otherwise, the detector 16 determines it as normal.

As described above, according to the first embodiment, the normalization parameters are updated in response to change in the observed data. Therefore, when numerical data that has a long-term increasing/decreasing trend is included as observed data for anomaly detection, it is possible to normalize the numerical data while taking into account the increasing/decreasing trend. In other words, it is possible to generate feature values (normalized vector) that take into account a long-term change in data collected from a target of anomaly detection.

Next, a second embodiment will be described. In the second embodiment, points that differ from the first embodiment will be described. The points not specifically mentioned in the second embodiment may be the same as in the first embodiment.

In the second embodiment, at Step S104 in FIG. 4, the preprocessor 13 calculates the mean $\mu\_i$ and the standard deviation $\sigma\_i$ of distribution of metrics i in a group of vectors, instead of the maximum value $xmax\_i$ of each metric i in the group of vectors.

For example, assuming that training data as flow data $xtrain\_\{d, i\}$ (d=1 . . . , D, i=1 . . . , N where D represents the number of training data items and N represents the dimensionality of the input metrics) is {{80, 20}, {90, 35}, and {100, 50}}, the mean $\mu\_1$ and the standard deviation $\sigma\_1$ of the first dimension (=the number of bytes in TCP) are calculated as $\mu\_1$=90 and $\sigma\_1$=8.16, respectively, and for the second dimension (=the number of bytes in UDP), these are calculated as $\mu\_2$=35 and $\sigma\_2$=12.2, respectively. These average $\mu\_i$ and standard deviation $\sigma\_i$ are stored in the parameter storage 122 as standardization parameters.

At Step S105, the preprocessor 13 converts the value of each metric i of the vector by the following formula so as to be standardized.

$$xtrain'\_\{d, i\}=(xtrain\_\{d, i\}-\mu\_i)/\sigma\_i$$

In other words, the value of each metric i is standardized based on the mean $\mu\_i$ and the standard deviation $\sigma\_i$. Consequently, the training data $xtrain\_\{d, i\}$ is standardized to be {{−1.22, −1.22}, {0, 0}, {1.22, 1.22}}.

In a state where the standardized parameters based on the training data is stored in the parameter storage 122, if a vector generated at Step S203 in FIG. 5 is {60, 40}, the value of each metric i of the vector is standardized to {−3.67, 0.41} by the mean $\mu\_i$ and the standard deviation $\sigma\_i$ based on the training data stored in the parameter storage 122.

Thereafter, the standardized parameters are updated at Step S104 in FIG. 5 in response to accumulation of learning data. For example, if the learning data is accumulated for U minutes (here, assume U=3) and the values are {{60, 40}, {45, 20}, {30, 30}}, the standardized parameters are updated to $\mu\_1=45$, $\sigma\_1=12.2$, $\mu\_2=30$, and $\sigma\_2=8.16$ and stored in the parameter storage 122.

Accordingly, at Step S105 to be executed next and at Step S204 to be executed thereafter, the vector is standardized based on the updated standardization parameters.

As described above, according to the second embodiment, substantially the same effect can be obtained as in the first embodiment.

Note that the embodiments described above may be applied to data collected from a source other than a network. For example, each of the above embodiments may be applied to data collected from a computer system.

Note that in each of the embodiments described above, the anomaly detection device 10 is an example of a feature value generation device. The preprocessor 13 is an example of a generator.

As above, the embodiments of the present invention have been described in detail. Note that the present invention is not limited to such specific embodiments, and various modifications and changes may be made within the scope of the subject matters of the present invention described in the claims.

The present application claims priority based on Japanese Patent Application No. 2017-017920 filed on Feb. 2, 2017, entire contents of which are hereby incorporated by reference.

LIST OF REFERENCE SYMBOLS

10 anomaly detection device
11 receiver
12 learning process controller
13 preprocessor
14 learning unit
15 detection process controller
16 detector
20 measuring device
100 drive device
101 recording medium
102 auxiliary storage device
103 memory device
104 CPU
105 interface device
121 training data storage
122 parameter storage
123 observed data storage
124 learning result storage
125 learning data storage
B Bus
N1 network

The invention claimed is:

1. A feature value generation device comprising:
processing circuitry configured to
generate vectors whose elements are feature values of data items collected at each of a plurality of timings, which are each upon an elapse of a predetermined time interval that is not greater than three minutes, from a target of anomaly detection, so as to perform normalization on the vectors, after a predetermined amount of vectors are stored, based on a set of predetermined vectors, the target being a system including a plurality of measuring devices that sample the data items within the system, the feature value generation device being connected to each of the plurality of measuring devices and the processing circuitry is configured to collect the data items from the measuring devices, wherein within the predetermined time interval the feature values are collected at sub-intervals such that a plurality of data items for a particular type of data item are collected at each of the plurality of timings and the normalization of the vectors includes at each of the plurality of timings, dividing each of the collected data items for a particular type of data item by a maximum value of the particular type of data item that is collected occurs during the respective timing;
generate an autoencoder that learns the predetermined vectors so as to output a learning result by duplicating a respective vector into two, applying one of the two vectors to the input layer to the autoencoder, and applying the other of the two vectors to the output layer, to execute learning so as to output the learning result; and
for each of the plurality of timings, detect, for each of the vectors normalized, an anomaly based on said each of the vectors and the learning result,
wherein the set of predetermined vectors is a set of vectors, stored as learning data in a learning data storage, with which no anomaly is detected by the processing circuitry, and for each of the plurality of timings, the entire set of vectors stored in the learning data storage based on the most recent collected vectors when no anomaly is detected by the processing circuitry and the entire set of vectors is not stored in the learning data storage based on the most recent collected vectors when an anomaly is detected by the processing circuitry based on a most recent learning result output by the autoencoder.

2. The feature value generation device as claimed in claim 1, wherein the system is a network that is constituted with multiple nodes being connected with each other, in which packets are transmitted and received between the nodes to provide predetermined services.

3. The feature value generation device as claimed in claim 2, wherein the data items to be collected include MIB (Management Information Base) data, flow data by Net-Flow, and CPU utilization.

4. A feature value generation method executed by a feature value generation device, the method comprising:
generating vectors whose elements are feature values of data items collected at each of a plurality of timings, which are each upon an elapse of a predetermined time interval that is not greater than three minutes, from a target of anomaly detection, so as to perform normalization on the vectors, after a predetermined amount of vectors are stored, based on a set of predetermined vectors, the target being a system including a plurality of measuring devices that sample the data items within the system, the feature value generation device being connected to each of the plurality of measuring devices and method includes collecting the data items from the measuring devices, wherein within the predetermined time interval the feature values are collected at sub-intervals such that a plurality of data items for a particular type of data item are collected at each of the plurality of timings and the normalization of the vectors includes at each of the plurality of timings, dividing each of the collected data items for a particular type of data item by a maximum value of the particular type of data item that is collected occurs during the respective timing;
generating an autoencoder that learns the predetermined vectors so as to output a learning result by duplicating a respective vector into two, applying one of the two vectors to the input layer to the autoencoder, and applying the other of the two vectors to the output layer, to execute learning so as to output the learning result; and for each of the plurality of timings, detecting, for each of the vectors normalized, an anomaly based on said each of the vectors and the learning result, wherein the set of predetermined vectors is a set of vectors, stored as learning data in a learning data storage, with which no anomaly is detected, and for each of the plurality of timings, the entire set of vectors stored in the learning data storage based on the most recent collected vectors when no anomaly is detected and the entire set of vectors is not stored in the learning data storage based on the most recent collected vectors when an anomaly is detected based on a most recent learning result output by the autoencoder.

5. A non-transitory computer-readable recording medium having a program stored thereon for causing a computer to execute the feature value generation method as claimed in claim 4.

\* \* \* \* \*